March 21, 1939. C. E. BRUCE 2,151,372
ERASER CLEANER
Filed Sept. 11, 1936 2 Sheets-Sheet 1
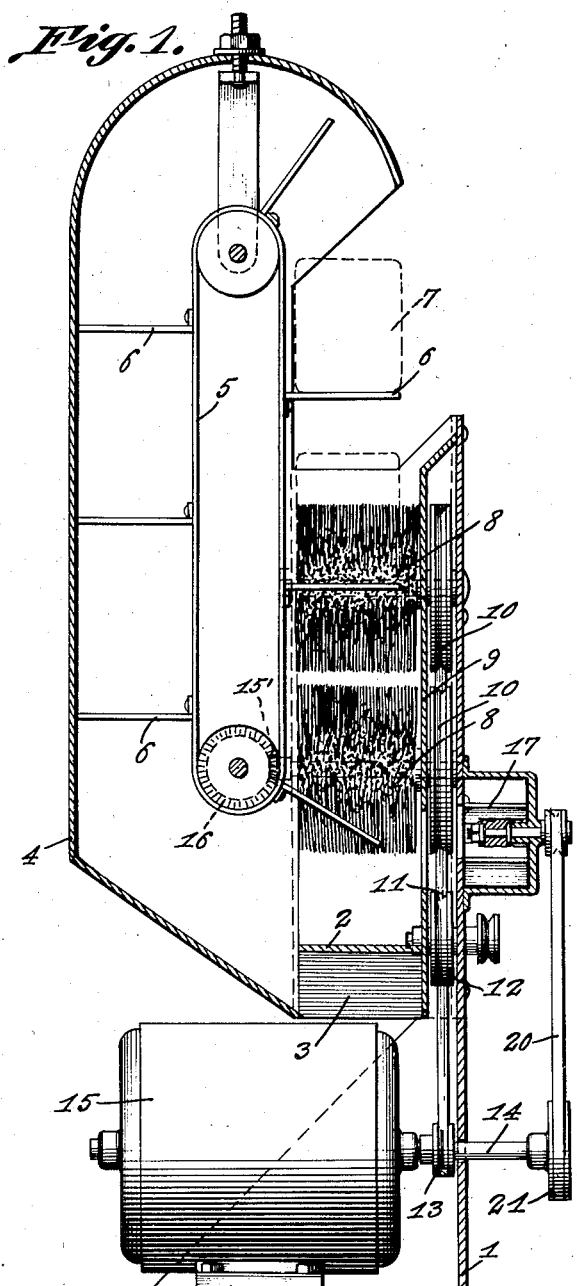
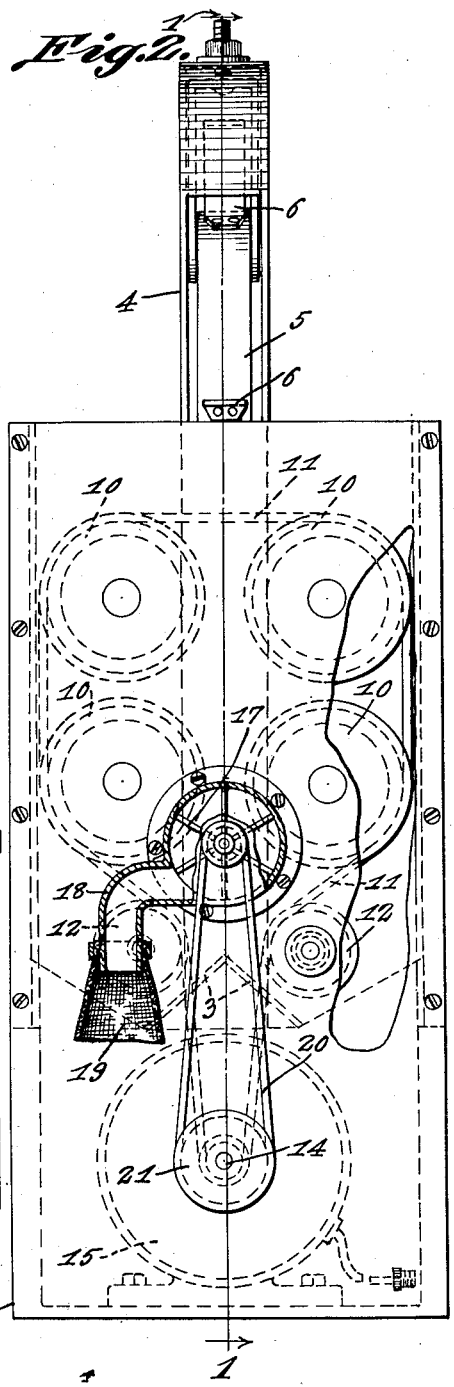
Charles E. Bruce, INVENTOR
BY Victor J. Evans & Co.
ATTORNEYS March 21, 1939.     C. E. BRUCE     2,151,372
ERASER CLEANER
Filed Sept. 11, 1936     2 Sheets-Sheet 2

Charles E. Bruce, INVENTOR
BY Victor J. Evans & Co.
ATTORNEYS

Patented Mar. 21, 1939

2,151,372

UNITED STATES PATENT OFFICE 2,151,372

ERASER CLEANER

Charles E. Bruce, Marshalltown, Iowa

Application September 11, 1936, Serial No. 100,373

1 Claim. (Cl. 15—21)

This invention relates to devices especially adapted for cleaning erasers employed in schools or educational institutes for removing chalk, crayon and the like from black boards and has for the primary object, the provision of a device of the above stated character whereby a large number of erasers may be easily and quickly cleaned and the dirt and other foreign matter removed therefrom may be collected and prevented from scattering and thereby permit the cleaning operation to be readily carried out by an unskilled person and with a minimum expenditure of effort.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating an eraser cleaner constructed in accordance with my invention.

Figure 2 is a front elevation partly in section illustrating the same.

Figure 3:
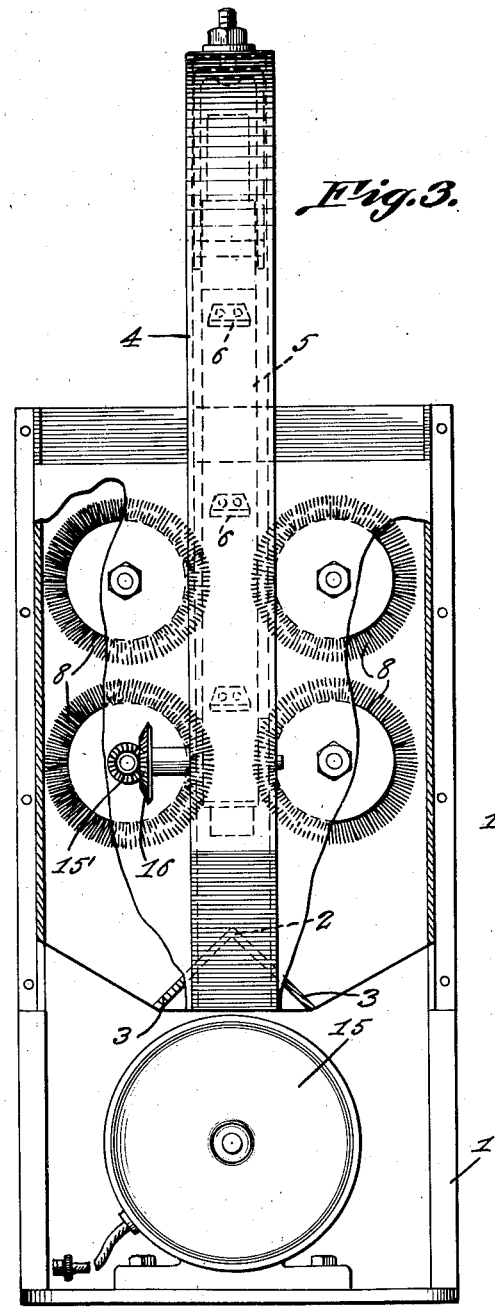
Figure 3 is a rear elevation partly in section illustrating the same.
Figure 4:
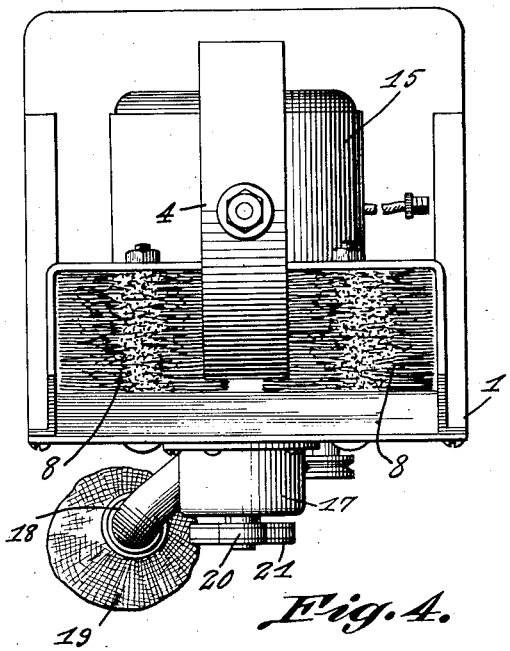
Figure 4 is a top plan view illustrating the device.

Referring in detail to the drawings, the numeral 1 indicates a casing, the upper end of which is fully opened. A wall 2 is arranged in the casing and is provided with oppositely inclined portions 3 for the purpose of directing erasers from the casing after being cleaned. A guard 4 rises from the wall 2 and outwardly through the upper end of the casing and supports an endless conveyor 5 provided with spaced flights 6. A space is provided between the upper end of the casing and the upper portion of the guard to permit erasers 7 to be placed on the flights for movement downwardly in the casing toward the wall 2. Pairs of brushes 8 are journalled in the casing 1 with one run of the conveyor passing between said pairs of brushes. A guard wall 9 is arranged in the casing 1 adjacent the front wall and the shafts of the brushes extend therethrough and have secured thereon grooved pulleys 10 over which is trained a drive belt 11. The drive belt 11 is also trained over spaced idle pulleys 12 journalled in the casing and about a drive pulley 13 secured to the shaft 14 of an electric motor 15 mounted within the casing whereby the brushes are rotated by the motor so that by the movement of the erasers between said brushes foreign matter will be brushed therefrom. The shaft of one of the brushes has secured thereto a pinion 15 meshing with a gear 16 secured to the lower drum of the conveyor 5 for the purpose of driving the conveyor to cause movement of the erasers downwardly between the brushes.

A suitable suction fan 17 is mounted on the front wall of the casing and below the brushes in communication with the interior of the casing and is provided with an outlet pipe 18 to which a collecting receptacle 19 is attached so that the dirt and other foreign matter removed from the erasers by the brushes will be drawn or forced into the receptacle 19 by the suction of the fan. The fan is driven by an endless belt 20 trained over a pulley 21 secured to the shaft 14 of the motor 15.

As the erasers pass from between the lower pair of brushes they gravitate onto the inclined portions 3 of the wall 2 and are directed outwardly of the casing, thus it will be seen that a machine has been provided whereby a large number of erasers may be fed therethrough in a short period of time and that when the erasers leave the machine they will be free of dirt and other foreign matter. It is to be understood that this machine may be successfully operated by hand should electricity not be convenient by substituting a crank on the shaft 14 for the motor 15, also that the speed of rotation of the brushes may be varied by changing the size of the drive pulley. Further it will be seen that a machine constructed in accordance with the foregoing may be conveniently operated by a person unskilled and that the device is of a portable nature so that it may be conveniently carried from one place to another.

While I have shown and described the preferred embodiment of my invention, it will be understood that minor changes in construction, combination and arrangement of parts may be made without departing from the spirit and scope of my invention, as claimed.

Having thus described my invention, what I claim is:—

An eraser cleaner comprising a casing open at the upper end thereof and provided with discharge openings in opposite sides and adjacent the bottom of said casing, a wall arranged in the casing and including oppositely inclined portions extending in the direction of said openings for directing erasers from said casing by way of said openings, a channeled guard carried by the wall and rising therefrom outwardly of the casing and having a hood shaped upper end, a vertically arranged endless conveyor located in the guard and having one run thereof located for moving erasers downwardly toward the wall and discharging the erasers on said wall and including a plurality of flights on which the erasers may be placed, pairs of rotary brushes engaging the erasers as they move toward the wall, said hood-shaped end of the guard being spaced from the upper end of the casing to permit the erasers to be positioned on the flights, and means for operating the brushes and conveyor.

CHARLES E. BRUCE.